July 1, 1958 J. J. FRANK 2,840,852
METHOD OF SEALING THE END OF STUFFED CASINGS
Filed June 2, 1953 2 Sheets-Sheet 1

INVENTOR.
JOSEPH J. FRANK
BY
ATTORNEY

July 1, 1958  J. J. FRANK  2,840,852
METHOD OF SEALING THE END OF STUFFED CASINGS
Filed June 2, 1953  2 Sheets-Sheet 2

INVENTOR.
JOSEPH J. FRANK
BY
John H. Seymour
ATTORNEY

United States Patent Office

2,840,852
Patented July 1, 1958

2,840,852

METHOD OF SEALING THE END OF STUFFED CASINGS

Joseph J. Frank, Union, N. J.

Application June 2, 1953, Serial No. 359,137

4 Claims. (Cl. 17—45)

This invention relates to a method and means for sealing the end of a stuffed flexible casing. The invention is particularly advantageous in the manufacture of sausages, of encased smoked meats, and other meat products. It is also useful in sealing the ends of flexible casings which are stuffed with any kind of soft, or loose, or comminuted, or deformable, or compressible materials. I include all such encased products, held within a sealed flexible casing, within the general term sausage for lack of a one word generic term of better connotation. The invention will be described in this application to the manufacture of a meat sausage, but it is to be understood that the specific description is not a limitation on the generality of uses to which the invention may be put.

Sausages may still be made of ground or rolled or smoked meat by methods which involve a certain amount of hand labor. This labor begins with a flexible tube of appropriate length which is sealed at one end by pleating the end and tying it with an intricate string knot. The casing is then opened at the opposite end, slid over a stuffing horn and stuffed with the meat product. The open end is then withdrawn from the horn and pleated and tied with a similar knot. That method is still used and is believed to have been exclusively used until 1946. At about that time, the assignee of this application placed on the market a new means and method of sealing such casings, involving a metallic barrel fastener. In the intervening years, hand methods of tying the first end of the casings have been largely abandoned, but hand methods of tying with string have been continued for the second end, which is tied after the stuffing, for reasons which need not be set forth in detail, but which involve the problems of removing the air from the casing, securing a snug fit of the casing against the end of the food content, and fitting the fastener to the end of the stuffed casing.

It is an object of this invention to seal the end of a stuffed casing, particularly a casing containing a meat product, and especially a sausage.

The invention includes a method of sealing filled casings, and apparatus. The method involves sealing a casing at one end, or using a casing already closed at one end, stuffing the casing, constricting the open end of the casing, expelling the air from that end through the constriction, if need be, and sealing the constriction in close proximity to the contents of the casing. In sealing products which have some resilience, the casing end can be pressed against the end of the contents, slightly compressing them, and removing air through the constricted neck of the sausage, then when the sealing has been accomplished, the natural resilience of the product will fill out the end to a smooth curve. The expulsion of the air can be carried out against an abutment by passing the neck of the casing through an aperture in an abutment and pulling on it, sealing being carried out when the air has been expelled, and the casing is tight packed. In enclosing smoked meats and other foodstuffs, it is usually advisable to withdraw air from the casing before sealing, and this can be done as above described. Suction devices may also be used to assist in the extraction of air.

The apparatus invention includes a shaped abutment plate, preferably a saucer having a more or less spherical face which shapes the end of the filled casing, which assists in expelling air through the constricted end, and may be combined in novel combination with sealing means for the neck of the casing.

The method and apparatus are illustrated in the accompanying drawing wherein Fig. 1 is a vertical section on line 1, 1 of Fig. 2.

Figure 10:
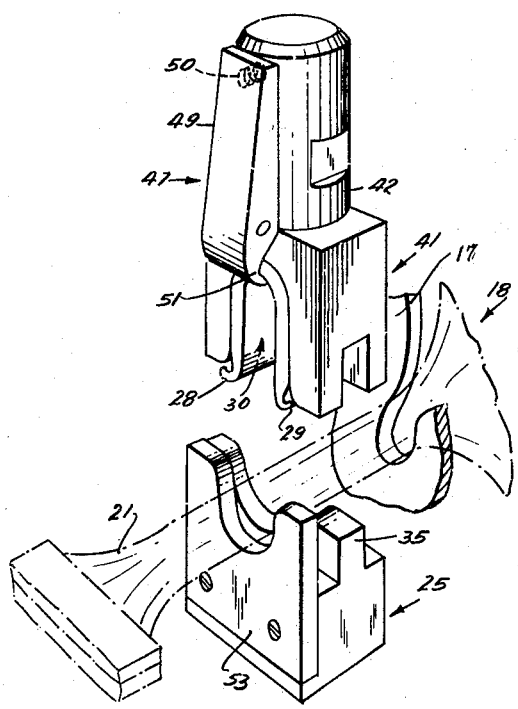
Fig. 10 is an enlarged fragmentary view in perspective of the portion of the apparatus at the dies, the upper die being shown in raised position and about to apply a fastener to the constricted neck of a filled casing.
Figure 11:
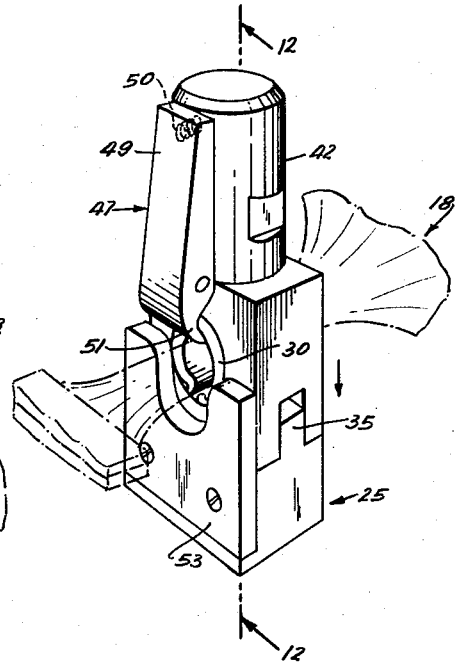
Fig. 11 is a view similar to Fig. 10, but with the upper die in its lower terminal position, and with a fastener fully applied to and clinched about the constricted neck of the filled casing.
Figure 12:
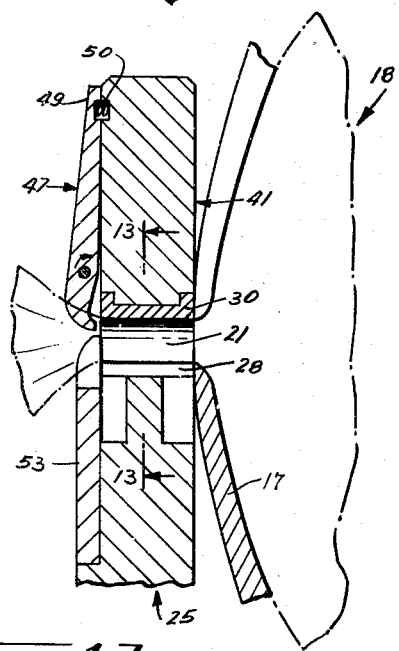
Figure 13:
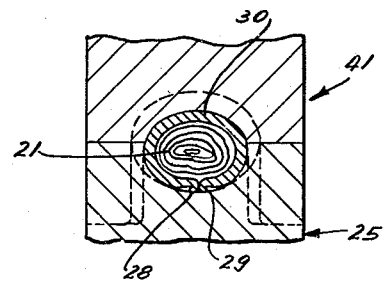

Fig. 12 is an enlarged view in longitudinal vertical section through the apparatus of Figs. 10 and 11, the section being taken generally along line 12—12 of Figs. 11 and 13.

Fig. 13 is a fragmentary enlarged view in transverse vertical section through the central portion of the apparatus of Figs. 10, 11, and 12, the section being taken generally along line 13—13 of Fig. 12.

Figure 1:
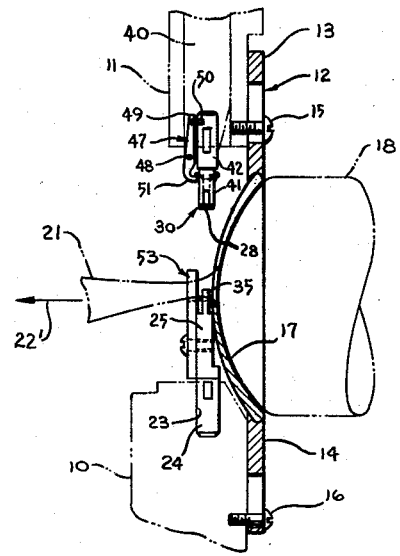
Figure 2:
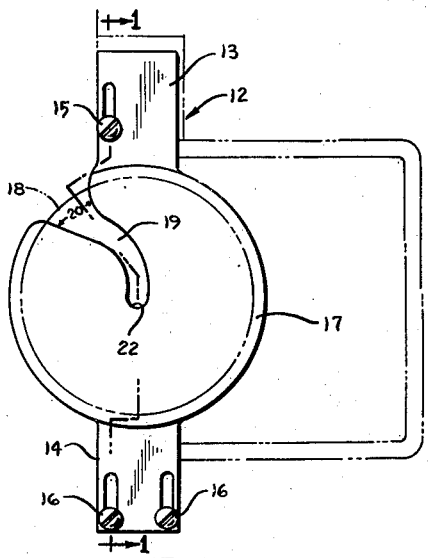
Fig. 2 is an elevational view from the right hand side of Fig. 1.

Referring first to Figs. 1 and 2; the numeral 10 indicates the lower arm of the sealing machine, 11 indicates the upper arm thereof, both arms being fixed in position during the operation of the machine. On the right hand side of the two arms, as shown in the drawing, is affixed an abutment plate 12 which includes a pair of extensions 13, 14, which are attached to the upper and lower arms by bolts 15, 16, respectively. Between and held by these extensions is a saucer 17, which is spherical and, as shown in the drawing, has an inner 2½ inch radius, and an outer 3⅝ inch radius, thus providing a strong abutment which is very thin at the center compared to the edge. From an upper quadrant of this plate a slot 19, having a wide mouth 20, enters the body in a direction which is shown as chordial, rather than diametrical, but as it approaches a vertical diameter, it curves towards the center where it occupies an area very restricted in size compared to the mouth.

In operating the device, the operator seizes the filled casing 18 by the neck 21, lays it upon a table behind the saucer, brings the neck 21 into the mouth or opening 20, and down to the end 22 of the slot, thus using the shape of the slot to constrict the neck close to the meat, or other content. He then pulls the neck in the direction of the arrow 22', so that the end of the casing is jammed against the plate 17 with such force as he chooses to exert, and the air in the end of the casing is expelled through the neck 21 which, although constricted, has not yet been sealed. It has, however, been constricted sufficiently to prevent the entry of the contents into the neck. At this time, the casing is sealed.

Figure 9:
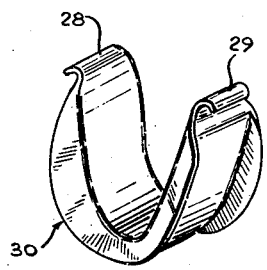
Fig. 9 is an enlarged perspective of the fastener employed in the operation.

The sealing device is a horseshoe fastener of the type shown in Fig. 9. This fastener has a more or less flat band of stiff but flexible metal with longitudinally extending flanges. The ends of the band are turned inward by a machine and driven against the body of the constriction, firmly sealing all its plies.

Figures 3, 4:
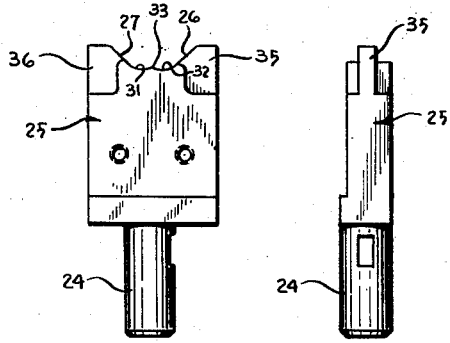
Fig. 3 is an enlarged front elevational view of a novel die.
Fig. 4 is an enlarged end elevational view of the die of Fig. 3.

Looking now at Fig. 1, the arm 10 has a socket 23 which receives the stud 24 of the die 25 shown in Figs. 3 and 4. The upper face of the die has two cam surfaces, 26, 27, which receive the ends 28, 29 of the fastener 30 of Fig. 9, and begin constriction of the fastener upon the neck 21 of the casing by turning them inward toward the cylindrical surfaces 31, 32, which reverse their directions and bring them into engagement with each other at septum 33 where they are reversed in direction, producing further constriction, and driven into the neck 21 without rupturing the material of the neck.

The cam surfaces are in part supplied by a pair of ears, or fins, 35, 36, which are of less thickness than the body 25 of the die and serve an additional purpose in combination with the opposed punch.

Figures 5, 6:
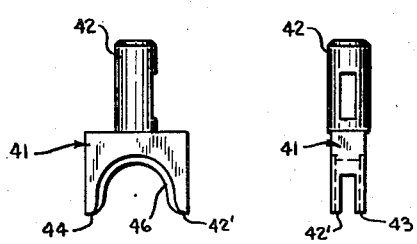
Fig. 5 is an enlarged elevational view of a novel punch.
Fig. 6 is an enlarged side elevational view of the punch of Fig. 5.

In Figs. 1, 5, and 6 are shown the punch mechanism which includes a plunger 40 which is slidable in the arm 11, and carries at its lower end the punch 41 which is mounted in the plunger 40 by means of stud 42. The punch is bifurcated, having furcations 42', 43, on one side, and 44 (45 not shown), on the other. These furcations are spaced apart by a distance equal to the width of the ears 35, 36, so that the ears and bifurcations are engaged during the operation of the fastener, and positively confine the fastener to its intended course.

Figure 8:
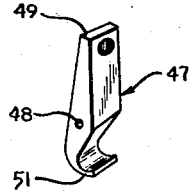
Fig. 8 is an enlarged perspective of the locating finger.

The inner surfaces 46 conform to the exterior shape of the fastener 30 within the side flanges, and a spring finger 47 (Figs. 1 and 8) holds the fastener in place in the punch until the fastener has been applied. The spring finger 47 is mounted on a pivot 48, and its upper end 49 is thrust to the left, as shown in the drawing, by the spring 50 which bears against a part of the machine. The spring has only enough tension to allow point 51 of the finger to retain the open fastener, but not enough to prevent the fastener from being withdrawn from the finger after it has been affixed to the neck of the casing. Thus, on the down stroke of plunger 40, the fastener is applied to the neck 21, and on the up stroke it is released by the finger.

Figure 7:
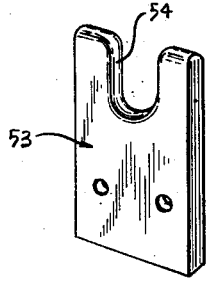
Fig. 7 is an enlarged perspective of a guide plate.

A guide plate (Figs. 1 and 7) 53, has a central notch 54, which is aligned with end 22 of slot 19, so that the notch and the slot constrict the neck on opposite sides of the die and punch, thus confining the lateral dimension of the neck to those which are readily received within the descending fastener, and positioning it accurately.

The manner of application of fastener 30 to the constricted neck 21 of the filled container 18, and the appearance of the fastener after its final application to the neck 21 more fully appear in Figs. 10-13, inclusive. As there shown, the open fastener 30 is applied (Fig. 10) in open-end-down position, being carried downwardly by upper die 41 as the latter makes its descending, operative stroke. When the die 41 has reached the lower terminus of its stroke (Fig. 11), the lower ends of the fastener 30 will have bent inwardly toward each other (Fig. 13) so that they are substantially in contact, the erstwhile generally straight leg portions of the fastener being rounded inwardly, by inner surfaces of die 25, and tightly embracing the folds of constricted neck 21 of the container.

The shape of the abutment plate can be altered to suit a particular operation, being conical, or spherical, or even flat, depending upon the requirements of the package. The slot can be admitted at any part of the saucer desired, and may have any useful configuration.

An advantage of this invention is that it becomes possible to seal the end of a filled casing rapidly and perfectly, and at the same time to expel the air from the casing efficiently, and without the use of complex devices whenever such expulsion is desirable. The sausage thus produced has the advantage that it is sealed at both ends by metal fasteners. The horse-shoe fastener of this invention may be applied to both ends, if desired, or the first end may, with equal efficiency, be sealed by the barrel fastener.

The punch and die are constructed on new principles, and are extremely efficient. The saucer, or compression plate, is novel and valuable. The package thus produced is superior in appearance, and is more sanitary than the products of the prior art.

The invention is not limited to the packaging of sausage and other food products, but can be employed in packaging all type of articles, particularly those that come in small sizes and need to be packaged firmly.

The present invention allows one to apply a casing to its contents with all the pressure, or any part of it, that the casing and the product will stand. Thus, the packages that are made by this invention are always tight, and firmly packaged. This is true even though a small quantity is packed in a large casing.

As many apparently widely different embodiments of the present invention may be made without departing from the spirit and scope thereof, it is to be understood that the invention is not limited to the specific embodiments.

What is claimed is:

1. The method of sealing the end of a stuffed sausage having a length of filled casing and a length of unfilled casing at its end, which comprises constricting said unfilled portion to form a neck, applying tension to said neck portion while applying resistive force to said filled portion thereof to expel air therefrom and form the end of said filled portion into generally convex shape, and sealing the neck adjacent said filled portion.

2. The method as defined in claim 1 wherein the neck is located generally axially of the sausage.

3. The method as defined in claim 2 wherein the resistive force is applied over at least substantially the entire area of the end of the sausage adjacent said neck.

4. The method as defined in claim 3 wherein the total resistive force is made up of components so located and applied to said end of the sausage as to shape the end into a smoothly curved convex shape.

References Cited in the file of this patent

UNITED STATES PATENTS

| | | |
|---|---|---|
| 526,080 | Lefeber | Sept. 18, 1894 |
| 557,378 | Gill | Mar. 31, 1896 |
| 2,111,273 | Becker | Mar. 15, 1938 |
| 2,282,666 | McCue | May 12, 1942 |
| 2,325,769 | Haag | Aug. 3, 1943 |
| 2,493,063 | Frank et al. | Jan. 3, 1950 |

FOREIGN PATENTS

| | | |
|---|---|---|
| 288,891 | Germany | Nov. 23, 1915 |
| 625,116 | Germany | Feb. 4, 1936 |